United States Patent [19]
Drent

[11] Patent Number: 5,330,952
[45] Date of Patent: Jul. 19, 1994

[54] CATALYST COMPOSITIONS

[75] Inventor: Eit Drent, Amsterdam, Netherlands

[73] Assignee: Shell Oil Company, Houston, Tex.

[21] Appl. No.: 33,214

[22] Filed: Mar. 18, 1993

Related U.S. Application Data

[62] Division of Ser. No. 805,227, Dec. 11, 1991, Pat. No. 5,229,475.

[30] Foreign Application Priority Data

Dec. 13, 1990 [NL] Netherlands ............... 9002739

[51] Int. Cl.$^5$ .................. B01J 31/00; B01J 31/18; B01J 31/24
[52] U.S. Cl. ...................... 502/162; 502/168; 502/170
[58] Field of Search ................... 502/162, 168, 170

[56] References Cited

U.S. PATENT DOCUMENTS

| | | | |
|---|---|---|---|
| 3,694,412 | 9/1972 | Nozaki | 260/63 |
| 4,818,810 | 4/1989 | Drent | 528/392 |
| 4,831,114 | 5/1989 | Drent | 502/162 X |
| 4,835,250 | 5/1989 | Drent | 528/392 |
| 4,843,144 | 6/1989 | Van Broekhoven et al. | 528/392 |
| 4,868,282 | 9/1989 | Van Broekhoven et al. | 528/392 |
| 4,880,903 | 11/1989 | Van Broekhoven et al. | 528/392 |
| 5,229,475 | 7/1993 | Drent | 528/392 |

FOREIGN PATENT DOCUMENTS

| | | |
|---|---|---|
| 121965 | 10/1984 | European Pat. Off. |
| 181014 | 5/1986 | European Pat. Off. |
| 213671 | 3/1987 | European Pat. Off. |
| 257663 | 3/1988 | European Pat. Off. |
| 262745 | 4/1988 | European Pat. Off. |

*Primary Examiner*—Asok Pal
*Attorney, Agent, or Firm*—James O. Okorafor

[57] ABSTRACT

A novel catalyst composition containing a palladium salt, an anion of a non-hydrohalogenic acid with a $pk_a$ of less than 2, a phosphorus bidentate ligand and an acid with a $pk_a$ of at least 4 but less than 6. The catalyst composition effectively polymerizes carbon monoxide and at least one ethylenically unsaturated hydrocarbon to produce linear, alternating polymers.

5 Claims, No Drawings

CATALYST COMPOSITIONS

This is a division of application Ser. No. 805,227, filed Dec. 11, 1991, now U.S. Pat. No. 5,229,475.

FIELD OF THE INVENTION

The invention relates to novel catalyst compositions suitable for use in the preparation of linear alternating polymers of carbon monoxide with one or more olefinically unsaturated hydrocarbons, and to a process of producing such polymers.

BACKGROUND OF THE INVENTION

The class of linear alternating polymers of carbon monoxide and at least one olefinically unsaturated hydrocarbon has been known for some time. Such polymers were produced by Nozaki, e.g., U.S. Pat. No. 3,694,412, using arylphosphine complexes of palladium moieties as catalysts and certain inert solvents. More recent methods for the production of such linear alternating polymers, now known as polyketone polymers or polyketones are illustrated by a number of published European Patent Applications including nos. 121,965, 181,014, 213,671, and 257,663. The processes generally involve the use of a catalyst composition formed from:

a) a compound of a Group VIII metal
b) an anion of a strong non-hydrohalogenic acid, and
c) a phosphorus bidentate ligand of the general formula (R)(R)P-R'-P(R) in which R independently is a hydrocarbyl or substituted hydrocarbyl group, and R' represents a divalent organic bridging group which contains from two to four carbon atoms in the bridge connecting the two phosphorus atoms.

Preferred catalyst compositions are formed from:

a) a compound of a Group VIII metal selected from palladium, cobalt or nickel,
b) an anion of a non-hydrohalogenic acid with a $Pk_a$ of less than 2,
c) a phosphorus bidentate ligand of the general formula (R)(R)P-R'-P-(R)(R) in which R and R' have the previously indicated meaning.

It has now been found that the polymerization activity of these catalyst compositions can be greatly improved by incorporating therein a weak acid.

SUMMARY OF THE INVENTION

The present patent application therefore relates to novel catalyst compositions formed from a palladium compound, an anion of a non-hydrohalogenic acid with a $pK_a$ of less than 2, a phosphorus bidentate ligand, and an acid with a $pK_a$ of at least about 4 but about less than 6. The invention further relates to the application of these catalyst compositions in tile preparation of linear alternating polymers of carbon monoxide with one or more ethylenically unsaturated hydrocarbons.

DETAILED DESCRIPTION OF THE INVENTION

In the catalyst compositions according to the invention, one compound is a compound of palladium which is particularly preferred as the Group VIII metal. The source of the palladium in the catalyst compositions is a salt of a carboxylic acid, and in particular is the acetate.

The anions which are used in the catalyst compositions are derived from non-hydrohalogenic acids with a $pK_a$ of less than 2. Examples of such acids are mineral acids such as sulphuric acid and perchloric acid, sulphonic acids such as methanesulphonic acid, trifluoromethanesulphonic acid and para-toluenesulphonic acid, and halocarboxylic acids such as trichloroacetic acid, difluoroacetic acid and trifluoroacetic acid. The source of the anion of an acid in the catalyst compositions is the acid or a salt, particularly a transition metal salt. As an acid, trifluoroacetic acid is very suitable, and as a salt, nickel perchlorate is very suitable. The quantity of the anion of an acid used in forming the catalyst compositions is from about 1 mol to about 100 mols and preferably about 2 mols to about 50 mols per mol of palladium.

The phosphorus bidentate ligands of the general formula (R)(R)P-R'-P(R)(R) where R and R' have the previously stated meanings, and Group R is a hydrocarbyl containing only atoms of carbon and hydrogen or is substituted hydrocarbyl containing additional atoms in the form of carbon atom substituents. Illustrative of aliphatic R groups are ethyl, propyl, hexyl, decyl, 2-chloro, 3-propyl, or 3-chloro-2-methylbutyl. Illustrative hydrocarbon aromatic R groups include phenyl, naphthyl, tolyl and xylyl. Preferred R groups, however are substituted aromatic substituents, particularly those aromatic R groups having a polar substituent, especially an alkoxy substituent, on at least one aromatic ring carbon atom which is ortho to the ring carbon atom through which the substituent is connected to the phosphorus. Such groups include 2-methoxyphenyl, 2-ethoxyphenyl, 2,4-dimethoxyphenyl and 2,4,6-tripropoxyphenyl. Especially preferred as the R group is 2-methoxyphenyl. The R' group is a divalent linking group of up to 10 carbon atoms inclusive with from 2 to 4 carbon atoms in the bridge. Illustrative of suitable R' groups are 1,2-ethylene, 1,3-propylene, 1,2-propylene, 2,2-dimethyl-1,3-propylene and 1,4-butylene. The preferred R' group is 1,3-propylene and the preferred bidentate phosphorus ligand is 1,3-bis[di(2-methoxyphenyl)phosphino]propane. The quantity of bidentate phosphorus ligand is suitably from about 0.5 mol to about 2 mols of the bidentate ligand per mol of palladium, preferably from about 0.75 mol to about 1.5 mol per mol of palladium.

As examples of weak acids with a $Pk_a$ of at least 4 but less than 6 which are eligible to be used as component d) in the catalyst compositions according to the invention, carboxylic acids are benzoic acid, acetic acid, adipic acid, iso-butyric acid, heptanoic acid, α-phenylbutyric acid, pivalic acid, valeric acid and 2,4,6-trimethylbenzoic acid and phenols such as pentachlorophenol and pentafluorophenol. Acetic acid is the preferred acid having a $Pk_a$ of at least 4 but less than 6. The quantity of acetic acid incorporated in the catalyst compositions is from about i mol to about 10,000 mols and in particular from about 1 mol to about 5,000 mols per mol of palladium.

In addition to the components comprising a palladium compound, an anion of an acid with a $Pk_a$ of less than 2, a phosphorus bidentate ligand, and an acid with a $Pk_a$ of at least about 4 but about less than 6, the catalyst compositions according to the invention can optionally contain an organic oxidizing agent. Examples of suitable organic oxidizing agents are 1,2- and 1,4-quinones, aliphatic nitrites such as butyl nitrite and aromatic nitro compounds such as nitrobenzene and 2,4-dinitrotoluene. 1,4-Benzoquinone and 1,4-naphthoquinone are preferred. The quantity of organic oxidizing agent used is up to about 5000 mols per mol of palladium and when present, preferred quantities are from about 1 mol to about 1000 mols of palladium.

The polymerization using the catalyst compositions according to the invention is preferably carried out by contacting the monomers with a solution of the catalyst composition in the liquid phase in the presence of a diluent in which the polymers are insoluble or virtually insoluble. Lower aliphatic alcohols such as methanol and ethanol are very suitable as diluents. The polymerization can also be carried out in a gas phase. The olefinically unsaturated compounds which can be polymerized with carbon monoxide are the unsaturated compounds which consist solely of carbon and hydrogen. Examples of suitable hydrocarbon monomers are ethylene and olefins of up to ten carbon atoms inclusive per molecule, such as propylene, butene-1, hexene-1 and octene-1. The catalyst compositions are particularly suitable for use in the preparation of copolymers of carbon monoxide with ethylene and in the preparation of terpolymers of carbon monoxide with ethylene and with propylene.

The quantity of catalyst composition used in the preparation of the polymers can vary within wide limits. Per mol of olefinically unsaturated compound to be polymerized, a quantity of catalyst composition is preferably used which contains from about $1 \times 10^{-7}$ mol to about $1 \times 10^{-3}$ mol of palladium and in particular from about $1 \times 10^{-6}$ to about $1 \times 10^{-4}$ mol of palladium.

The preparation of the polymers is carried out at a temperature of about 25° C. to about 150° C. and preferably from about 30° C. to about 130° C. The pressure in the preparation of the polymer is from about 2 bar to about 150 bar and preferably from about 5 bar to about 100 bar.

The molar ratio of carbon monoxide to total ethylenically unsaturated hydrocarbon in suitably from about 10:1 to about 1:10 but preferably is from about 5:1 to about 1:5. Subsequent to reaction, the polymer product is recovered from the polymerization mixture as by filtration or decantation. The polymer products are thermoplastic and are used in utilities conventional for other thermoplastics. Illustrative of specific applications are container for food and drink and automotive parts and housings.

The invention will now be illustrated with reference to the following comparative examples and illustrative embodiments. All polymers made were examined by $^{13}$C-NMR and found to be linear alternating polymers.

COMPARATIVE EXAMPLE 1

Into a stirred autoclave with a volume of 300 ml a catalyst composition solution was introduced consisting of:
50 ml methanol,
0.1 mmol palladium acetate,
2 mmol acetic acid, and
0.15 mmol 1,3-bis(diphenylphosphino)propane.

After removing air from the autoclave, ethylene was pressured in until a pressure of 30 bar was reached and then carbon monoxide was forced in until a pressure of 60 bar was reached. The contents of the autoclave were then brought to 90° C. After 5 hours the contents of the autoclave were cooled to room temperature and the pressure was released. Only a trace of polymer material was formed.

COMPARATIVE EXAMPLE 2

This example was carried out in substantially the same way as Comparative Example 1, but with the following differences:
a) the temperature was 135° C. instead of 90° C., and
b) the time was 15 hours instead of 5 hours.
In this case as well, only a trace of polymer material was formed.

COMPARATIVE EXAMPLE 3

This example was carried out in substantially the same way as Comparative Example 1, but with the following differences:
a) the catalyst composition solution contained 10 mmol acetic acid instead of 2 mmol,
b) 20 bar ethylene and 20 bar carbon monoxide were forced into the autoclave instead of 30 bar each, and
c) the time was 1 hour instead of 5 hours.
No polymer material was formed.

COMPARATIVE EXAMPLE 4

A carbon monoxide/ethylene copolymer was prepared as follows. Into a stirred autoclave with a volume of 250 ml a catalyst composition solution was introduced consisting of:
50 ml methanol,
0.1 mmol palladium acetate,
0.5 mmol nickel perchlorate, and
0.12 mmol 1,3-bis(di n-butylphosphino)propane.

After removing air from the autoclave, ethylene was forced in until a pressure of 20 bar was reached and then carbon monoxide was forced in until a pressure of 50 bar was reached. The contents of the autoclave were then brought to 70° C. After 4 hours the polymerization was terminated by cooling the reaction mixture to room temperature and releasing the pressure. The polymer was filtered off, washed with methanol and dried.

12.0 G copolymer was obtained. The polymerization rate was 300 g copolymer/g palladium hour.

ILLUSTRATIVE EMBODIMENT 1

A carbon monoxide/ethene copolymer was prepared in substantially the same way as in Comparative Example 4, but with the following differences:
a) the catalyst solution additionally contained 160 mmol acetic acid, and
b) the reaction time was 1.5 hours instead of 4 hours.
12.8 G copolymer was obtained. The polymerization rate was 850 g copolymer/g palladium hour.

COMPARATIVE EXAMPLE 5

A carbon monoxide/ethene copolymer was prepared in substantially the same way as in Comparative Example 4, but with the following differences:
a) the catalyst solution contained 2 mmol trifluoroacetic acid and 0.12 mmol 1,3-bis(diphenylphosphino)propane instead of nickel perchlorate and 1,3-bis(di n-butylphosphino)propane respectively, and
b) the reaction time was 2 hours instead of 4 hours.
15.0 G copolymer was obtained. The polymerization rate was 750 g copolymer/g palladium.hour.

ILLUSTRATIVE EMBODIMENT 2

A carbon monoxide/ethylene copolymer was prepared in substantially the same way as in Comparative Example 5, but with the difference that the catalyst solution additionally contained 160 mmol acetic acid.

22.0 G copolymer was obtained. The polymerization rate was 1100 g copolymer/g palladium hour.

What is claimed is:

1. A catalyst composition useful in the production of linear alternating polymers of carbon monoxide and at least one ethylenically unsaturated hydrocarbon formed by reacting a palladium compound; an anion of a non-hydrohalogenic acid with a pKa of less than 2; and a phosphorus bidentate ligand; the improvement which comprises including within the catalyst composition an acid with a pKa of above about 4 but less than about 6 selected from the group consisting of benzoic acid, acetic acid, adipic acid, isobutyric acid, heptanoic acid, α-phenylbutyric acid, pivalic acid, valeric acid, 2,4,,6-trimethylbenzoic acid, pentachlorophenol or pentafluorophenol.

2. A catalyst composition as in claim 1 wherein said acid is present in an amount of from about 1 mol to about 10,000 mols per mol of palladium.

3. A catalyst composition as in claim 1 further comprising an organic oxidizing agent.

4. A catalyst composition as in claim 3 wherein said oxidizing agent is selected from the group consisting of 1,2- and 1,4-quinones, aliphatic nitrites, or aromatic nitro compounds.

5. A catalyst composition as in claim 3 wherein said oxidizing agent is present in an amount of from 1 to 5000 mol per mol of palladium.

* * * * *